(12) United States Patent
Cohen et al.

(10) Patent No.: US 9,208,547 B2
(45) Date of Patent: Dec. 8, 2015

(54) STEREO CORRESPONDENCE SMOOTHNESS TOOL

(71) Applicant: Adobe Systems Incorporated, San Jose, CA (US)

(72) Inventors: Scott D. Cohen, Sunnyvale, CA (US); Brian L. Price, San Jose, CA (US); Chenxi Zhang, Lexington, KY (US)

(73) Assignee: Adobe Systems Incorporated, San Jose, CA (US)

( * ) Notice: Subject to any disclaimer, the term of this patent is extended or adjusted under 35 U.S.C. 154(b) by 336 days.

(21) Appl. No.: 13/720,258

(22) Filed: Dec. 19, 2012

(65) Prior Publication Data

US 2014/0169660 A1    Jun. 19, 2014

(51) Int. Cl.
 *G06K 9/40* (2006.01)
 *H04N 15/00* (2006.01)
 *G06T 5/50* (2006.01)
 *G06T 5/00* (2006.01)

(52) U.S. Cl.
 CPC . *G06T 5/50* (2013.01); *G06T 5/002* (2013.01); *G06T 2207/10012* (2013.01); *G06T 2207/20104* (2013.01)

(58) Field of Classification Search
 CPC . G06T 5/50; G06T 5/002; G06T 2207/20104; G06T 2207/10012; G06T 7/0075; G06T 7/0022; H04N 13/0239; H04N 2013/0081
 USPC ........ 382/154, 285, 294, 106, 153, 107, 284, 382/260, 195, 205, 181, 190, 254; 348/14.16, 42, E13.014, E13.008, 51, 348/14.08, 14.09, E13.025, E13.016, 47, 348/E13.067, E13.065, E7.08, 48; 345/419, 345/420, 418; 356/2; 396/89
 See application file for complete search history.

(56) References Cited

U.S. PATENT DOCUMENTS

| | | | |
|---|---|---|---|
| 4,591,928 A | 5/1986 | Bloom et al. | |
| 5,151,998 A | 9/1992 | Capps | |
| 5,583,977 A | 12/1996 | Seidl | |
| 5,652,828 A | 7/1997 | Silverman | |
| 5,671,283 A | 9/1997 | Michener et al. | |
| 5,808,616 A | 9/1998 | Shimizu | |
| 6,122,375 A | 9/2000 | Takaragi et al. | |
| 6,208,348 B1 * | 3/2001 | Kaye | 345/419 |
| 6,266,412 B1 | 7/2001 | Berenzweig et al. | |

(Continued)

FOREIGN PATENT DOCUMENTS

| EP | 1008112 | 3/2005 |
|---|---|---|
| WO | WO-2010086317 | 8/2010 |

OTHER PUBLICATIONS

"Non-Final Office Action", U.S. Appl. No. 12/852,349, Jan. 30, 2014, 35 pages.

(Continued)

*Primary Examiner* — Sheela Chawan
(74) *Attorney, Agent, or Firm* — Wolfe-SBMC

(57) ABSTRACT

Stereo correspondence smoothness tool techniques are described. In one or more implementations, an indication is received of a user-defined region in at least one of a plurality of stereoscopic images of an image scene. Stereo correspondence is calculated of image data of the plurality of stereoscopic images of the image scene, the calculation performed based at least in part on the user-defined region as indicating a smoothness in disparities to be calculated for pixels in the user-defined region.

20 Claims, 8 Drawing Sheets

(56) References Cited

U.S. PATENT DOCUMENTS

| | | |
|---|---|---|
| 6,316,712 B1 | 11/2001 | Laroche |
| 6,333,983 B1 | 12/2001 | Enichen |
| 6,370,247 B1 | 4/2002 | Takaragi et al. |
| 6,480,957 B1 | 11/2002 | Liao et al. |
| 6,750,873 B1 | 6/2004 | Bernardini et al. |
| 6,778,667 B1 | 8/2004 | Bakhle et al. |
| 6,792,113 B1 | 9/2004 | Ansell et al. |
| 6,804,355 B1 | 10/2004 | Graunke |
| 7,003,107 B2 | 2/2006 | Ananth |
| 7,103,181 B2 | 9/2006 | Ananth |
| 7,130,467 B1 | 10/2006 | Bronder et al. |
| 7,142,669 B2 | 11/2006 | Dworkin et al. |
| 7,200,226 B2 | 4/2007 | Bace |
| 7,213,156 B2 | 5/2007 | Fukuda |
| 7,218,733 B2 | 5/2007 | Li et al. |
| 7,221,756 B2 | 5/2007 | Patel et al. |
| 7,224,357 B2 | 5/2007 | Chen et al. |
| 7,269,664 B2 | 9/2007 | Hutsch et al. |
| 7,269,854 B2 | 9/2007 | Simmons et al. |
| 7,350,070 B2 | 3/2008 | Smathers et al. |
| 7,400,744 B2 * | 7/2008 | Nichani et al. ............... 382/103 |
| 7,412,060 B2 | 8/2008 | Fukuda |
| 7,418,100 B2 | 8/2008 | McGrew et al. |
| 7,536,016 B2 | 5/2009 | Benaloh |
| 7,603,563 B2 | 10/2009 | Ansell et al. |
| 7,636,691 B2 | 12/2009 | Maari |
| 7,680,269 B2 | 3/2010 | Nicolai et al. |
| 7,693,278 B2 | 4/2010 | Hiramatsu |
| 7,715,591 B2 | 5/2010 | Owechko et al. |
| 7,757,299 B2 | 7/2010 | Robert et al. |
| 7,827,408 B1 | 11/2010 | Gehringer |
| 7,836,311 B2 | 11/2010 | Kuriya et al. |
| 7,861,312 B2 | 12/2010 | Lee et al. |
| 7,884,854 B2 | 2/2011 | Banner et al. |
| 7,924,323 B2 * | 4/2011 | Walker et al. ............... 348/231.2 |
| 8,051,287 B2 | 11/2011 | Shetty et al. |
| 8,082,592 B2 | 12/2011 | Harris |
| 8,095,795 B2 | 1/2012 | Levy |
| 8,099,519 B2 | 1/2012 | Ueda |
| 8,103,505 B1 | 1/2012 | Silverman et al. |
| 8,130,952 B2 | 3/2012 | Shamoon et al. |
| 8,184,182 B2 | 5/2012 | Lee et al. |
| 8,189,769 B2 | 5/2012 | Ramasamy et al. |
| 8,199,216 B2 | 6/2012 | Hwang |
| 8,245,033 B1 | 8/2012 | Shetty et al. |
| 8,291,219 B2 | 10/2012 | Eto |
| 8,300,812 B2 | 10/2012 | Van De Ven |
| 8,315,396 B2 | 11/2012 | Schreiner et al. |
| 8,345,976 B2 | 1/2013 | Wang et al. |
| 8,390,704 B2 | 3/2013 | Wang et al. |
| 8,417,806 B2 | 4/2013 | Chawla et al. |
| 8,428,390 B2 | 4/2013 | Li et al. |
| 8,447,098 B1 | 5/2013 | Cohen et al. |
| 8,520,083 B2 | 8/2013 | Webster et al. |
| 8,543,386 B2 | 9/2013 | Oh et al. |
| 8,548,226 B2 * | 10/2013 | Sakano et al. ............... 382/154 |
| 8,571,305 B2 * | 10/2013 | Kao ............... 382/154 |
| 8,571,308 B2 | 10/2013 | Grafulla-González |
| 8,583,443 B2 | 11/2013 | Misawa |
| 8,586,847 B2 | 11/2013 | Ellis et al. |
| 8,615,108 B1 | 12/2013 | Stoppa et al. |
| 8,619,082 B1 | 12/2013 | Ciurea et al. |
| 8,694,319 B2 | 4/2014 | Bodin et al. |
| 8,731,913 B2 | 5/2014 | Zopf et al. |
| 8,738,633 B1 | 5/2014 | Sharifi et al. |
| 8,805,560 B1 | 8/2014 | Tzanetakis et al. |
| 8,855,334 B1 | 10/2014 | Lavine et al. |
| 8,879,731 B2 | 11/2014 | Schultz |
| 8,886,543 B1 | 11/2014 | Sharifi et al. |
| 8,903,088 B2 | 12/2014 | Schultz |
| 8,914,290 B2 | 12/2014 | Hendrickson et al. |
| 8,953,811 B1 | 2/2015 | Sharifi et al. |
| 9,064,318 B2 | 6/2015 | Price et al. |
| 9,076,205 B2 | 7/2015 | Cho et al. |
| 9,135,710 B2 | 9/2015 | Cohen et al. |
| 2002/0154779 A1 | 10/2002 | Asano et al. |
| 2004/0030656 A1 | 2/2004 | Kambayashi et al. |
| 2004/0184655 A1 | 9/2004 | Ziegler et al. |
| 2004/0254660 A1 | 12/2004 | Seefeldt |
| 2005/0015343 A1 | 1/2005 | Nagai et al. |
| 2005/0201591 A1 | 9/2005 | Kiselewich |
| 2005/0232463 A1 | 10/2005 | Hirvonen et al. |
| 2006/0045211 A1 | 3/2006 | Oh et al. |
| 2006/0078194 A1 | 4/2006 | Fradkin et al. |
| 2006/0122839 A1 | 6/2006 | Li-Chun Wang et al. |
| 2006/0165240 A1 | 7/2006 | Bloom et al. |
| 2006/0173846 A1 | 8/2006 | Omae et al. |
| 2006/0221072 A1 | 10/2006 | Se et al. |
| 2007/0041663 A1 | 2/2007 | Cho et al. |
| 2007/0061145 A1 | 3/2007 | Edgington et al. |
| 2007/0070226 A1 | 3/2007 | Matusik et al. |
| 2007/0087756 A1 | 4/2007 | Hoffberg |
| 2007/0132763 A1 | 6/2007 | Chu et al. |
| 2007/0291958 A1 | 12/2007 | Jehan |
| 2008/0036761 A1 | 2/2008 | Mazzanti |
| 2008/0120230 A1 | 5/2008 | Lebegue et al. |
| 2008/0246757 A1 | 10/2008 | Ito |
| 2009/0055139 A1 | 2/2009 | Agarwal et al. |
| 2009/0125726 A1 | 5/2009 | Iyer et al. |
| 2009/0259684 A1 | 10/2009 | Knight et al. |
| 2009/0276628 A1 | 11/2009 | Cho et al. |
| 2009/0279697 A1 | 11/2009 | Schneider |
| 2009/0290710 A1 | 11/2009 | Tkachenko et al. |
| 2009/0306972 A1 | 12/2009 | Opitz et al. |
| 2009/0307489 A1 | 12/2009 | Endoh |
| 2009/0315670 A1 | 12/2009 | Naressi et al. |
| 2010/0105454 A1 | 4/2010 | Weber |
| 2010/0153747 A1 | 6/2010 | Asnaashari et al. |
| 2010/0172567 A1 | 7/2010 | Prokoski |
| 2010/0208779 A1 | 8/2010 | Park et al. |
| 2010/0246816 A1 | 9/2010 | Thomas et al. |
| 2010/0257368 A1 | 10/2010 | Yuen |
| 2010/0279766 A1 | 11/2010 | Pliska et al. |
| 2010/0284607 A1 | 11/2010 | Van Den Hengel et al. |
| 2010/0322042 A1 | 12/2010 | Serletic et al. |
| 2011/0043864 A1 | 2/2011 | Tian et al. |
| 2011/0112670 A1 | 5/2011 | Disch et al. |
| 2011/0131219 A1 | 6/2011 | Martin-Cocher et al. |
| 2011/0161669 A1 | 6/2011 | Eto |
| 2011/0173208 A1 | 7/2011 | Vogel |
| 2011/0230987 A1 | 9/2011 | Anguera Miró et al. |
| 2012/0042167 A1 | 2/2012 | Marking et al. |
| 2012/0046954 A1 | 2/2012 | Lindahl et al. |
| 2012/0056982 A1 | 3/2012 | Katz et al. |
| 2012/0173865 A1 | 7/2012 | Swaminathan |
| 2012/0173880 A1 | 7/2012 | Swaminathan |
| 2012/0216300 A1 | 8/2012 | Vivolo et al. |
| 2012/0219229 A1 | 8/2012 | Springer et al. |
| 2012/0321172 A1 | 12/2012 | Jachalsky et al. |
| 2013/0064443 A1 | 3/2013 | Schlosser et al. |
| 2013/0113881 A1 | 5/2013 | Barnum |
| 2013/0124148 A1 | 5/2013 | Jin et al. |
| 2013/0127824 A1 | 5/2013 | Cohen et al. |
| 2013/0132733 A1 | 5/2013 | Agrawal et al. |
| 2013/0142330 A1 | 6/2013 | Schultz |
| 2013/0142331 A1 | 6/2013 | Schultz |
| 2013/0173273 A1 | 7/2013 | Kuntz et al. |
| 2013/0191491 A1 | 7/2013 | Kotha et al. |
| 2013/0243313 A1 | 9/2013 | Civit et al. |
| 2013/0243314 A1 | 9/2013 | Civit et al. |
| 2013/0290818 A1 | 10/2013 | Arrasvuori et al. |
| 2013/0343606 A1 | 12/2013 | Dal Mutto et al. |
| 2014/0023291 A1 | 1/2014 | Lin |
| 2014/0119643 A1 | 5/2014 | Price |
| 2014/0135962 A1 | 5/2014 | King et al. |
| 2014/0136976 A1 | 5/2014 | King et al. |
| 2014/0140626 A1 | 5/2014 | Cho |
| 2014/0142947 A1 | 5/2014 | King |
| 2014/0148933 A1 | 5/2014 | King |
| 2014/0152776 A1 | 6/2014 | Cohen |
| 2014/0153816 A1 | 6/2014 | Cohen |
| 2014/0168215 A1 | 6/2014 | Cohen |

(56) References Cited

U.S. PATENT DOCUMENTS

2014/0177903 A1   6/2014   Price
2014/0201630 A1   7/2014   Bryan
2014/0310006 A1   10/2014  Anguera Miro et al.

OTHER PUBLICATIONS

"Non-Final Office Action", U.S. Appl. No. 13/309,982, Mar. 24, 2014, 35 pages.
"Non-Final Office Action", U.S. Appl. No. 13/310,032, Mar. 7, 2014, 21 pages.
"Non-Final Office Action", U.S. Appl. No. 13/690,755, Mar. 28, 2014, 7 pages.
Sinha, et al., "Interactive 3D Architectural Modeling from Unordered Photo Collections", ACM Transactions on Graphics, vol. 27, No. 5, Article 159, Dec. 2008, pp. 159:1-159:10.
Kubo, Shiro et al., "Characterization of the Tikhonov Regularization for Numerical Analysis of Inverse Boundary Value Problems by Using the Singular Value Decomposition", *Inverse Problems in Engineering Mechanics*, 1998, pp. 337-344.
"Final Office Action", U.S. Appl. No. 13/690,755, Sep. 10, 2014, 7 pages.
"Non-Final Office Action", U.S. Appl. No. 13/660,159, Oct. 1, 2014, 7 pages.
"Non-Final Office Action", U.S. Appl. No. 13/680,952, Aug. 4, 2014, 8 pages.
"Notice of Allowance", U.S. Appl. No. 13/309,982, Jul. 30, 2014, 6 pages.
"Notice of Allowance", U.S. Appl. No. 13/310,032, Aug. 26, 2014, 6 pages.
"Restriction Requirement", U.S. Appl. No. 13/722,825, Oct. 9, 2014, 7 pages.
Zhu, et al., "Fusion of Time-of-Flight Depth and Stereo for High Accuracy Depth Maps", IEEE Conference on Computer Vision and Pattern Recognition, Jun. 23, 2008, 8 pages.
Maps, IEEE Conference on Computer Vision and Pattern Recognition, Jun. 23, 2008, 8 pages.
"Time Domain Pitch Scaling using Synchronous Overlap and Add", retrieved from <http://hompages.inspire.net.nz/~jamckinnon/report/sola.htm> on Nov. 12, 2012, 3 pages.
"Waveform Similarity Based Overlap-Add (WSOLA)", retrieved from <http://www.pjsip.org/pjmedia/docs/html/group__PJMED_WSOLA.htm> on Nov. 12, 2012, 4 pages.
De Gotzen, Amalia et al., "Traditional (?) Implementations of a Phase-Vocoder: The Tricks of the Trade", *Proceedings of the COST G-6 Conference on Digital Audio Effects (DAFX-00)*, Verona, Italy, Dec. 7-9, 2000, retrieved from <http://128.112.136.35/courses/archive/spring09/cos325/Bernardini.pdf> on Nov. 12, 2012,(Dec. 7, 2000), 7 pages.
Dolson, Mark, "The Phase Vocoder: A Tutorial", retrieved from <http://www.panix.com/~jens/pvoc-dolson.par> on Nov. 12, 2012, 11 pages.
Gutierrez-Osuna, Ricardo "L19: Prosodic Modificatin of Speech", Lecture based on [Taylor, 2009, ch. 14; Holmes, 2001, ch. 5; Moulines and Charpentier, 1990], retrieved from <http://research.cs.tamu.edu/prism/lectures/sp/l19.pdf> on Nov. 12, 2012, 35 pages.
Klingbeil, Michael "SPEAR: Sinusoidal Partial Editing Analysis and Resynthesis", retrieved from <http://www.klingbeil.com/spear/> on Nov. 12, 2012, 3 pages.
McAulay, R. J., et al., "Speech Processing Based on Sinusoidal Model", *The Lincoln Laboratory Journal*, vol. 1, No. 2, 1998, retrieved from <http://www.ll.mit.edu/publications/journal/pdf/vol01_no2/1.2.3.speechprocessing.pdf> on Nov. 12, 2012,(1988), pp. 153-168.
Moinet, Alexis et al., "PVSOLA: A Phase Vocoder with Synchronized Overlap-Add", *Proc. of the 14th Int. Conference on Digital Audio Effects (DAFx-11)*, Paris, France, Sep. 19-23, 2011, retrieved from <http://tcts.fpms.ac.be/publications/papers/2011/dafx2011_pvsola_amtd.pdf> on Nov. 12, 2012,(Sep. 19, 2011), 7 pages.

Patton, Joshua "ELEC 484 Project—Pitch Synchronous Overlap-Add", retrieved from <http://www.joshpatton.org/yeshua/Elec484/Elec484_files/ELEC%20484%20-%20PSOLA%20Final%20Project%20Report.pdf> on Nov. 12, 2012, 11 pages.
Rodet, Xavier "Musical Sound Signal Analysis/Synthesis: Sinusoidal+Residual and Elementary Waveform Models", *TFTS'97 (IEEE Time-Frequency and Time-Scale Workshop 97)*, Coventry, Grande Bretagne, août, 1997, retrieved from <http://articles.ircam.fr/textes/Rodet97e/index.html> on Nov. 12, 2012,(1997), 16 pages.
Roelands, Marc et al., "Waveform Similarity Based Overlap-Add (WSOLA) for Time-Scale Modification of Speech: Structures and Evaluation", retrieved from <http://citeseerx.ist.psu.edu/viewdoc/summary?doi=10.1.1.58.1356> on Nov. 12, 2012, 4 pages.
Serra, Xavier "A System for Sound Analysis/Transformation/Synthesis Based on a Determinsistic Plus Stochastic Decomposition", retrieved from <https://ccrma.stanford.edu/files/papers/stanm58.pdf> on Nov. 12, 2012, (Oct. 1989), 166 pages.
Serra, Xavier "Approaches to Sinusoidal Plus Residual Modeling", retrieved from <http://www.dtic.upf.edu/~xserra/cursos/CCRMA-workshop/lectures/7-SMS-related-research.pdf> Nov. 12, 2012, 21 pages.
Serra, Xavier "Musical Sound Modeling with Sinusoids Plus Noise", published in C. Roads, S. Pope, A. Picialli, G. De Poli, editors. 1997. *"Musical Signal Processing"*. Swets & Zeitlinger Publishers, retrieved from <http://web.media.mit.edu/~tristan/Classes/MAS.945/Papers/Technical/Serra_SMS_97.pdf> on Nov. 12, 2012,(1997), 25 pages.
Smith III, Julius O., "MUS421/EE367B Applications Lecture 9C: Time Scale Modification (TSM) and Frequency Scaling/Shifting", retrieved from <https://ccrma.stanford.edu/~jos/TSM/TSM.pdf> on Nov. 12, 2012, (Mar. 8, 2012), 15 pages.
Upperman, Gina "Changing Pitch and PSOLA for Voice Conversion", retrieved from <http://cnx.org/content/m12474/latest/?collection=col10379l/1.1> on Nov. 12, 2012, 1 page.
Verhelst, Werner "Overlap-Add Methods for Time-Scaling of Speech", retrieved from <http://citeseerx.ist.psu.edu/viewdoc/summary?doi=10.1.1.128.7991> on Nov. 12, 2012, 25 pages.
Verhelst, Werner et al., "An Overlap-Add Technique Based on Waveform Similarity (WSOLA) for High Quality Time-Scale Modification of Speech", retrieved from <http://citeseerx.ist.psu.edu/viewdoc/download?doi=10.1.1.202.5460&rep=rep1&type=pdf> on Nov. 12, 2012, 4 pages.
"Final Office Action", U.S. Appl. No. 12/852,349, (Sep. 13, 2013), 34 pages.
"Final Office Action", U.S. Appl. No. 13/309,982, (Nov. 1, 2013), 34 pages.
"Final Office Action", U.S. Appl. No. 13/310,032, (Oct. 31, 2013), 21 pages.
Felzenszwalb, Pedro F., et al., "Efficient Belief Propagation for Early Vision", *International Journal of Computer Vision*, 70(1), (2006), pp. 41-54.
Gastal, Eduardo S., et al., "Shared Sampling for Real-Time Alpha Matting", *Eurographics 2010*, vol. 29, No. 2, (2010),10 pages.
He, Kaiming et al., "A Global Sampling Method for Alpha Matting", *CVPR 2011*, (2011), pp. 2049-2056.
Levin, Anat et al., "A Closed Form Solution to Natural Image Matting", *CVPR*, 2006, (2006), 8 pages.
Park, Youngja et al., "Extracting Salient Keywords from Instructional Videos Using Joint Text, Audio and Visual Cues", *Proceedings of the Human Language Technology Conference of the North American Chapter of the ACL*, Association for Computational Linguistics, 2006,(Jun. 2006), pp. 109-112.
Radhakrishnan, Regunathan et al., "A Content-Adaptive Analysis and Representation Framework for Audio Event Discovery from "Unscripted" Multimedia", Hindawi Publishing Corporation, *EURASIP Journal on Applied Signal Processing*, vol. 2006, Article ID 89013, (2006), 24 pages.
Smaragdis, Paris "A Probabilistic Latent Variable Model for Acoustic Modeling", *NIPS*, (2006), 6 pages.
Smaragdis, Paris "Supervised and Semi-Supervised Separation of Sounds from Single-Channel Mixtures", *ICA'07 Proceedings of the*

(56) References Cited

OTHER PUBLICATIONS

*7th international conference on Independent component analysis and signal separation*, (2007), 8 pages.

Smith, Alvy R., et al., "Blue Screen Matting", *SIGGRAPH 96 Conference Proceedings*, (Aug. 1996),10 pages.

Yang, Qingxiong et al., "A Constant-Space Belief Propagation Algorithm for Stereo Matching", *CVPR*, (2010), 8 pages.

"Restriction Requirement", U.S. Appl. No. 13/660,159, Jun. 12, 2014, 6 pages.

"Final Office Action", U.S. Appl. No. 12/852,349, (Nov. 19, 2012), 28 pages.

"Non-Final Office Action", U.S. Appl. No. 12/852,349, (Apr. 10, 2013), 26 pages.

"Non-Final Office Action", U.S. Appl. No. 12/852,349, (Jul. 5, 2012),17 pages.

"Non-Final Office Action", U.S. Appl. No. 13/309,982, (Jan. 17, 2013), 32 pages.

"Non-Final Office Action", U.S. Appl. No. 13/310,032, (Jan. 3, 2013),18 pages.

Breckon, et al., "Non-parametric 3D Surface Completion", *International Conference on 3D Digital Imaging and Modeling'05* (Jun. 13, 2005), 8 pages., (Jun. 13, 2005), 8 pages.

Curless, Brian et al., "A Volumetric Method for Building Complex Models from Range Images", *In SIGGRAPH, ACM Press*, (Aug. 4, 1996),10 pages.

Davis, et al., "Filling Holes in Complex Surfaces using Volumtric Diffusion", *International Symposium on 3D Data Processing Visualization and Transmission.* Jun. 19, 2002, 11 pages., (Jun. 19, 2002),11 pages.

Debevec, Paul E., et al., "Modeling and Rendering Architecture from Photographs: A Hybrid Geometry- and Image-Based Approach", *SIGGRAPH Conference Proceedings*, (Jan. 1996), pp. 1-10.

Goesele, Michael et al., "Multi-View Stereo Revisited", *Computer Vision and Pattern Recognition*, (2006), 8 pages.

He, et al., "Corner detector based on global and local curvature properties", Retrieved from <http://hub.hku.hk/bitstream/10722/57246/1/142282.pdf> on Dec. 21, 2012, (May 2008),13 pages.

Hirsch, et al., "Fast Removal of Non-uniform Camera Shake", Retrived from <http://webdav.is.mpg.de/pixel/fast_removal_of_camera_shake/files/Hirsch_ICCV2011_Fast%20removal%20of%20non-uniform%20camera%20shake.pdf> on Dec. 21, 2012, 8 pages.

Jia, Jiaya "Single Image Motion Deblurring Using Transparency", Retrieved from <http://www.csxe.cuhk.edu.hk/~leojia/all_final_papers/motion_deblur_cvpr07.pdf> on Dec. 21, 2012, 8 pages.

Levin, et al., "Image and Depth from a Conventional Camera with a Coded Aperture", *ACM Transactons on Graphics, SIGGRAPH 2007 Conference Proceedings*, San Diego, CA, Retrieved from <http://groups.csail.mit.edu/graphics/CodedAperture/CodedAperture-LevinEtAl-SIGGRAPH07.pdf> on Dec. 21, 2012,(2007), 9 pages.

Okutomi, Masatoshi et al., "A Multiple-Baseline Stereo", *IEEE Transactions on Pattern Analysis and Machine Intelligence*, vol. 15, No. 4, (Apr. 1993),11 pages.

Sharf, et al., "Context-based Surface Completion", *ACM Trans. Graph.* Aug. 2004, 10 pages, (Aug. 2004),10 pages.

Smith, et al., "Stereo Matching with Nonparametric Smoothness Priors in Feature Space", *CVPR 2009* (Jun. 22, 2009), 8 pages., (Jun. 22, 2009), 8 pages.

Yuan, et al., "Image Deblurring with Blurred/Noisy Image Pairs", *Proceedings of ACM SIGGRAPH*, vol. 26, Issue 3, (Jul. 2007),10 pages.

"Non-Final Office Action", U.S. Appl. No. 13/681,643, Jan. 7, 2015, 10 pages.

"Non-Final Office Action", U.S. Appl. No. 13/675,807, Dec. 17, 2014, 18 pages.

"Supplemental Notice of Allowance", U.S. Appl. No. 13/310,032, Nov. 3, 2014, 4 pages.

"Adobe Audition", User Guide, 2003, 196 pages.

"Corrected Notice of Allowance", U.S. Appl. No. 13/660,159, Apr. 28, 2015, 2 pages.

"Corrected Notice of Allowance", U.S. Appl. No. 13/660,159, May 29, 2015, 2 pages.

"Final Office Action", U.S. Appl. No. 13/675,807, May 22, 2015, 24 pages.

"Final Office Action", U.S. Appl. No. 13/681,643, May 5, 2015, 14 pages.

"MPEG Surround Specification", International Organization for Standardization, Coding of Moving Pictures and Audio; ISO/IEF JTC 1/SC 29/WG 11; Bangkok, Thailand, Jan. 19, 2006, 186 pages.

"Non-Final Office Action", U.S. Appl. No. 13/675,711, Mar. 11, 2015, 14 pages.

"Non-Final Office Action", U.S. Appl. No. 13/688,421, Feb. 4, 2015, 18 pages.

"Non-Final Office Action", U.S. Appl. No. 13/690,755, Mar. 2, 2015, 8 pages.

"Non-Final Office Action", U.S. Appl. No. 13/722,825, Mar. 25, 2015, 17 pages.

"Notice of Allowance", U.S. Appl. No. 13/660,159, Mar. 10, 2015, 6 pages.

"Notice of Allowance", U.S. Appl. No. 13/680,952, Mar. 17, 2015, 6 pages.

"Restriction Requirement", U.S. Appl. No. 13/690,724, Feb. 26, 2015, 6 Pages.

Ioffe,"Improved Consistent Sampling, Weighted Minhash and L1 Sketching", ICDM '10 Proceedings of the 2010 IEEE International Conference on Data Mining, Dec. 2010, 10 pages.

Jehan,"Creating Music by Listening", In PhD Thesis of Massachusetts Institute of Technology, Retrieved from <http://web.media.mit.edu/~tristan/Papers/PhD_Tristan.pdf>, Sep. 2005, 137 pages.

Su,"Over-Segmentation Based Background Modeling and Foreground Detection with Shadow Removal by Using Hierarchical MRFs", Proceedings of the 10th Asian conference on Computer vision—vol. Part III, Nov. 2010, 12 pages.

Yang,"Stereo Matching with Color-Weighted Correlation, Hierarchical Belief Propagation, and Occlusion Handling", IEEE Transactions on Pattern Analysis and Machine Intelligence , vol. 31 Issue 3, Mar. 2009, 13 pages.

"Adobe Audition 3.0 User Guide", 2007, 194 pages.

"Final Office Action",U.S. Appl.No. 13/675,711, Jun. 23, 2015, 14 pages.

"Final Office Action", U.S. Appl. No. 13/688,421, Jul. 29, 2015, 22 pages.

"Non-Final Office Action",U.S. Appl. No. 13/690,724, Jun. 18, 2015, 7 pages.

"Notice of Allowance", U.S. Appl. No. 13/675,807, Aug. 27, 2015, 6 pages.

"Notice of Allowance", U.S. Appl. No. 13/690,755, Jun. 5, 2015, 6 pages.

"Notice of Allowance", U.S. Appl. No. 13/722,825, Aug. 28, 2015, 10 pages.

"Pre-Interview Communication", U.S. Appl. No. 13/720,316, Aug. 5, 2015, 3 pages.

"Supplemental Notice of Allowance", U.S. Appl. No. 13/680,952, Jun. 11, 2015, 3 pages.

"Supplemental Notice of Allowance", U.S. Appl. No. 13/690,755, Aug. 18, 2015, 4 pages.

Dueck,"Non-metric Affinity Propagation for Unsupervised Image Categorization", IEEE 11th International Conference on Computer Vision, 2007, Oct. 14, 2007, 8 pages.

Xiao,"Joint Affinity Propagation for Multiple View Segmentation", IEEE 11th International Conference on Computer Vision, 2007, Oct. 14, 2007, 7 pages.

"Corrected Notice of Allowance", U.S. Appl. No. 13/722,825, Sep. 21, 2015, 4 pages.

"First Action Interview Office Action", U.S. Appl. No. 13/720,316, Oct. 22, 2015, 4 pages.

"Non-Final Office Action", U.S. Appl. No. 13/681,643, Oct. 16, 2015, 27 pages.

\* cited by examiner

STEREO CORRESPONDENCE SMOOTHNESS TOOL

BACKGROUND

Stereo correspondence calculations may be used to determine which parts in stereo images correspond to each other. For example, stereo images may be captured of a scene using an image capture device. The stereo images may then be processed to determine which points in the images correspond to each other. This may be utilized to support a variety of functionality, such as to determine depth of the scene from the images to perform three dimensional modeling of the scene, perform view synthesis, view interpolation, content manipulation, matting (e.g., object removal), support augmented reality (e.g., object insertion), and so on.

However, conventional techniques that were employed to perform this processing could encounter ambiguities that are not able to be resolved using the conventional techniques. This may include ambiguities caused by regions of the images that do not include textures or features (e.g., a white wall), repeated patterns (e.g., a checkerboard), shadows, view-point changes, and so on. Consequently, processing at these points in the image could fail using conventional techniques.

SUMMARY

Stereo correspondence smoothness tool techniques are described. In one or more implementations, an indication is received of a user-defined region in at least one of a plurality of stereoscopic images of an image scene. Stereo correspondence is calculated of image data of the plurality of stereoscopic images of the image scene, the calculation performed based at least in part on the user-defined region as indicating a smoothness in disparities to be calculated for pixels in the user-defined region.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

As previously described, conventional techniques may be ill suited to determine stereo correspondence when confronted with a variety of ambiguities. These ambiguities include lack of textures or features (e.g., a white wall), repeated patterns (e.g., a checkerboard), shadows, view-point changes, and so on. Accordingly, stereo correspondence at such locations in stereo images may be difficult to determine using conventional techniques.

Stereo correspondence user interface techniques are described in which inputs received via a user interface may be used to assist a determination of stereo correspondence of stereo images. The user interface, for instance, may be configured to support user interaction such that a user may indicate a user-defined region. This interaction may be performed in a variety of ways, such as through use of a smoothness tool as a brush to "color over" the user-defined region, through output of a boundary selection tool (e.g., a cursor-controlled box), and so on.

The user-defined region may then be used to assist in calculating stereo correspondence of image data for a plurality of stereoscopic images of an image scene. For example, the indication of the user-defined region may be used to indicate a smoothness in disparities to be calculated for that region. In this way, stereo correspondence processing may be performed for that region such that disparity values for pixels in that region may vary smoothly from pixel to pixel. Additionally, the user interface may be configured to output a control such that a user may specify a weight to be applied for the smoothness in the values of the disparities of the pixels, one to another. A variety of other examples are also contemplated, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
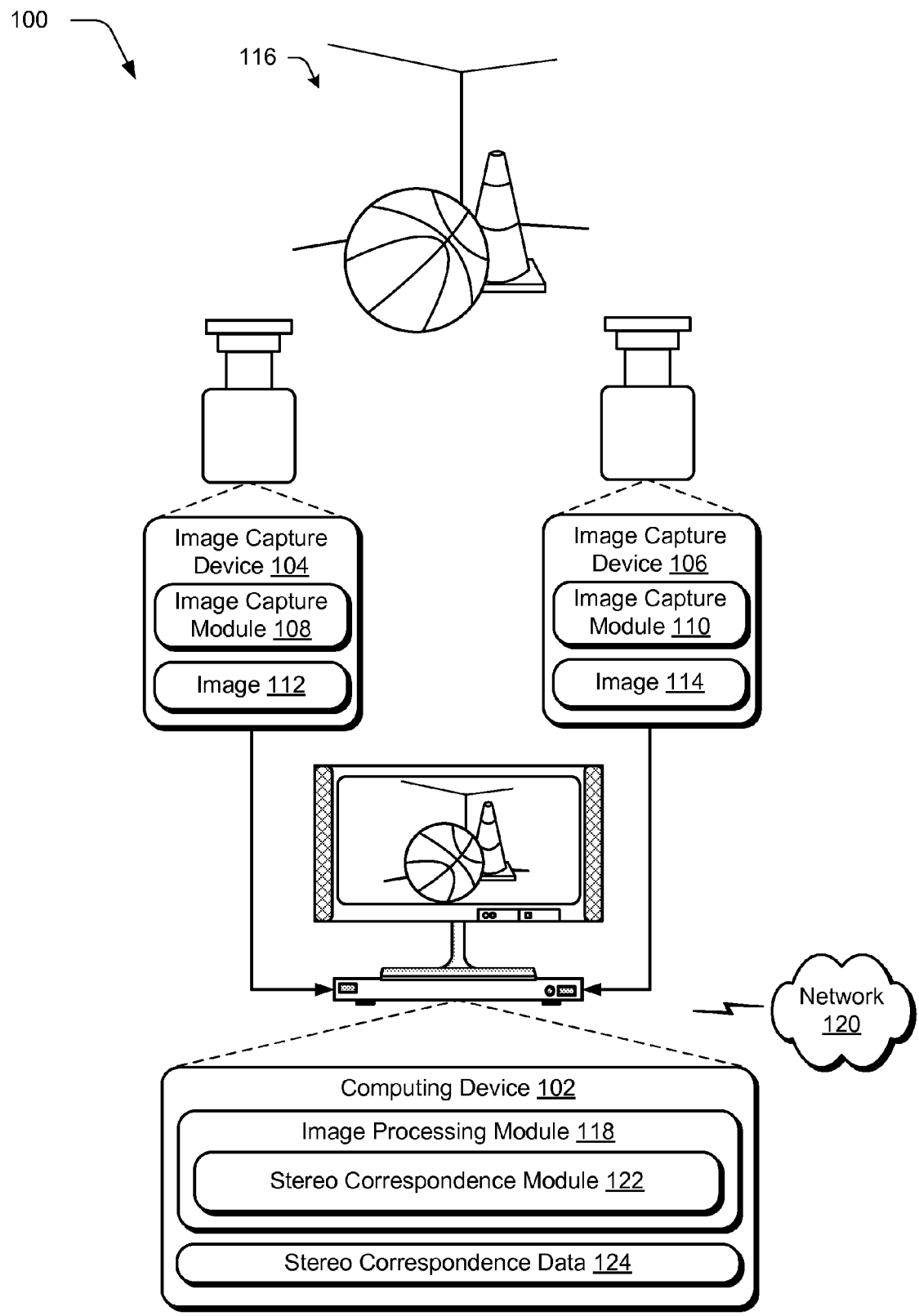
FIG. 1 is an illustration of an environment in an example implementation that is operable to employ techniques described herein involving a user interface.

FIG. 1 is an illustration of an environment 100 in an example implementation that is operable to employ techniques described herein. The illustrated environment 100 includes a computing device 102 and a plurality of image capture devices 104, 106, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 8.

The image capture devices 104, 106 may also be configured in a variety of ways. Illustrated examples of such configurations include a standalone camera such as a dedicated device, part of a mobile phone or tablet, and so on. Other examples are also contemplated. For example, each of the image capture devices 104, 106 may be configured as a single stereoscopic camera, scanner, copier, camera, mobile device (e.g., smart phone), and so forth. In another example, a single image capture device 104 may be used to capture multiple images of an image scene, such as the car, flag, and room as illustrated.

The image capture devices 104, 106 are illustrated as including a respective image capture module 108, 110. The image capture modules 108, 110 are representative of functionality to capture respective images 112, 114, such as by including image sensors and other hardware and software components to capture, process, and/or store images 112, 114.

The images 112, 114 in this example are stereoscopic in that the images are taken from different viewpoints of the illustrated image scene 116. For example, the images 112, 114 may be viewable by a user to gain a perception of three dimensional depth of the image scene. As previously described, the images 112, 114 may also be usable to model the image scene in three dimensions. This may be performed in a variety of ways as further described below.

The computing device 102 is illustrated as including an image processing module 118. The image processing module 118 is representative of functionality to perform one or more techniques that are usable to process an image. Although illustrated as implemented locally on the computing device, functionality of the image processing module may also be implemented in a distributed environment, remotely via a network 120 (e.g., "over the cloud") as further described in relation to FIG. 8, and so on.

An example of image processing that may be performed by the image processing module 118 is represented as a stereo correspondence module 122. The stereo correspondence module 122 is representative of functionality to generate stereo correspondence data 124 that describes which points (i.e., coordinates) in stereoscopic images correspond to each other. The stereo correspondence data 122, for instance, may process images 112, 114 to determine depth of the image scene to perform three dimensional modeling, perform view synthesis, view interpolation, content manipulation, matting (e.g., object removal), support augmented reality (e.g., object insertion), and so on. This processing may be performed in a variety of ways, further description of which may be found in the following discussion and corresponding figure.

Figure 2:
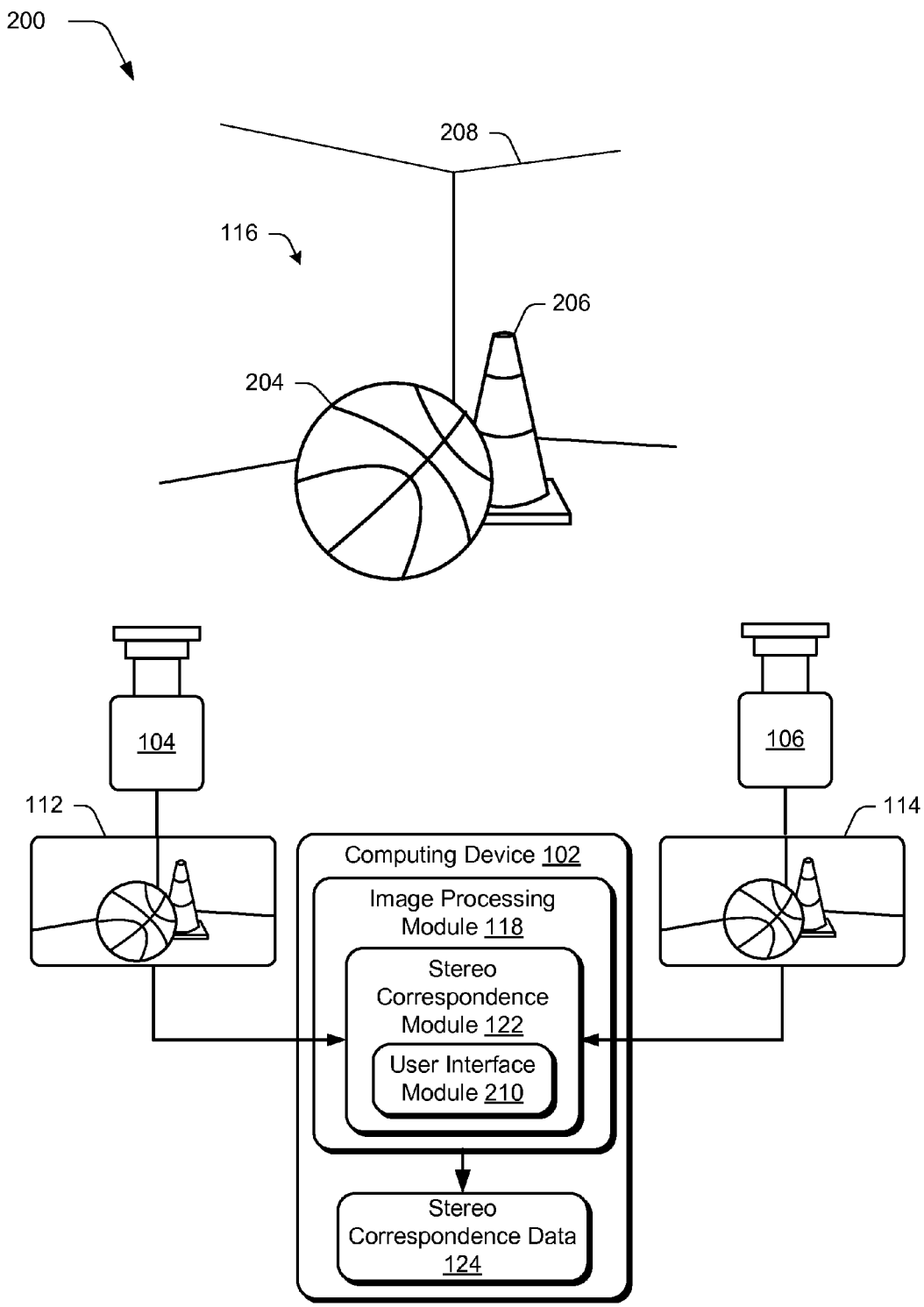
FIG. 2 depicts a system in an example implementation in which images are captured of an image scene and used in conjunction with a user interface to calculate stereo correspondence data.

FIG. 2 depicts a system 200 in an example implementation in which images 112, 114 are captured of an image scene 116 and used in conjunction with a user interface to calculate stereo correspondence data 128. The image scene 116 is illustrated as including a ball 204 and a traffic cone 206 in a white-walled room 208. The image capture devices 104, 106 are illustrated as capturing stereoscopic images 112, 114 of the image scene 116. As previously described, the stereoscopic images may be leveraged for a variety of purposes, such as for three dimensional modeling, view interpolation, and so on.

To support this functionality, the image processing module 118 may employ a stereo correspondence module 122 to compute stereo correspondence data 124 that describes which points in the images 112, 114 correspond to each other. Conventional techniques that were utilized to perform this technique typically relied upon analysis of textures and features in the images 112, 114, solely. However, the images may include portions that cause ambiguities in these conventional techniques. The white walled room 208, for instance, may lack texture and features and therefore cause ambiguities. In another instance, the traffic cone 206 may cause identification of image edges due to differences in textures that are not indicative of a depth discontinuity.

Accordingly, the stereo correspondence data 122 may leverage a user interface module 210 that is representative of functionality to output a user interface that may be used to assist in the calculation of the stereo correspondence data 124. This assistance may be provided through use of a variety of tools. For example, tools may be employed to specify user-defined regions in which a disparity is to vary smoothly, from one pixel to another.

For example, "P" may represent a set of pixels in an image. "L" may be used to represent a set of labels that represent disparities. Disparities describe a different in locations of corresponding pixels in a plurality of images, such as images 112, 114. The pixels, for instance, may define objects such as the ball 204, traffic cone 206 and so on. Accordingly, disparities of pixels that are considered to correspond to each other from the images 112, 114 may be used to extract depth information from two dimensional images. This may be calculated in a variety of ways.

For instance, stereo correspondence may be formulated as a labeling problem in which "P" is a set of pixels in an image. "L" is a set of labels that represent the disparities, and therefore "L" may be defined such that "$L=\{L_1, L_2, \ldots, L_{max}\}$." A value "f" is a labeling that is usable to assign a label "$f_p \in L$" to each pixel "$p \in P$."

Imaging planes of the images 112, 114 may be aligned in parallel, such that corresponding pixels in image 112 (e.g., "$I_{left}$" or "$I_1$" in the below discussion) correspond to pixels in image 114 (e.g., "$I_{right}$" or "$I_2$") in a same row "y". For example, correspondence of pixels in image 112 to pixels in image 114 may be described as follows:

$$I_{left}(P) \to I_{right}(P - f_p)$$

$$I_{left}(P + f_p) \to I_{right}(P)$$

Minimization of a cost function may then be performed to arrive at the stereo correspondence data 124, an example of which is described as follows:

$$E(f) = \sum_{p \in P} D(f_p) + \sum_{(p,q) \in N} V(f_p, f_q)$$

The above cost function "E(f)" includes two terms. The first term is a data cost that is used to measure color similarity of pixels in the images 112, 114, respectively. The data cost may be expressed as follows:

$$D_p(f_p) = \begin{cases} |I_{left}(p) - I_{right}(p - f_p)|, & p \in \text{left} \\ |I_{left}(p + f_p) - I_{right}(p)|, & p \in \text{right} \end{cases}$$

Thus, the data cost in the above expression is a measure color similarity of a pixel in a left view (e.g., "$I_{left}$") to a corresponding pixel in the right view (e.g., "$L_{right}$"), which is represented by a color difference between them. Thus, the data cost represents similarity of pixels between a plurality of stereoscopic images, e.g., images 112, 114.

The data cost may be used to assign a cost based on a comparison of a pixel to another pixel between images to determine which disparity is "best" and thus indicates a likely correspondence between the pixels. The stereo correspondence data 124, for instance, may be based on an examination of pixels in a row in image 114 to compare colors to a pixel chosen from image 112. Costs may be assigned based on this disparity and thus the data cost measures consistency of images. Therefore, if the colors are quite different (e.g., a white pixel from image 112 being compared to a black pixel in image 114) a cost of assigning the value of this pixel may be quite high in comparison with a pixel that is closer in color. Although costs are described, other techniques may also be employed, such as through use of thresholds, sum of squared differences, and so on.

The cost function "E(f)" also includes a second term, which represents a smoothness cost. The smoothness cost is based on an assumption that values of neighboring pixels are close. Accordingly, the smoothness cost of the energy function may be used to assign a cost based on similarity of a pixel to other pixels in the neighborhood of the pixel in the image, e.g., image 112 or image 114. Thus, the smoothness cost is based on consistency within the image, itself, as shown in the following expression:

$$v(f_p - f_q) = \min(c|f_p, f_q|, t)$$

A pairwise label cost is represented as "$|f_p, f_q|$" in the above expression. This calculation is generally performed for a neighborhood "N" for a pixel in question. In the above expression, a truncated linear model is employed is in which a cost increases linearly based on a different between labels "$f_p$" and "$f_q$" up to a level "t." Other examples are also contemplated.

As previously described, ambiguities may be encountered in calculating the stereo correspondence data 124 in areas that include a lack of textures or features (e.g., a white wall), repeated patterns (e.g., a checkerboard), shadows, view-point changes, and so on. Accordingly, techniques are described herein in which the user interface module 210 may output a user interface that is configured to assist in calculation of stereo correspondence based on one or more user inputs, an example of which is described as follows and shown in the corresponding figure.

Figure 3:
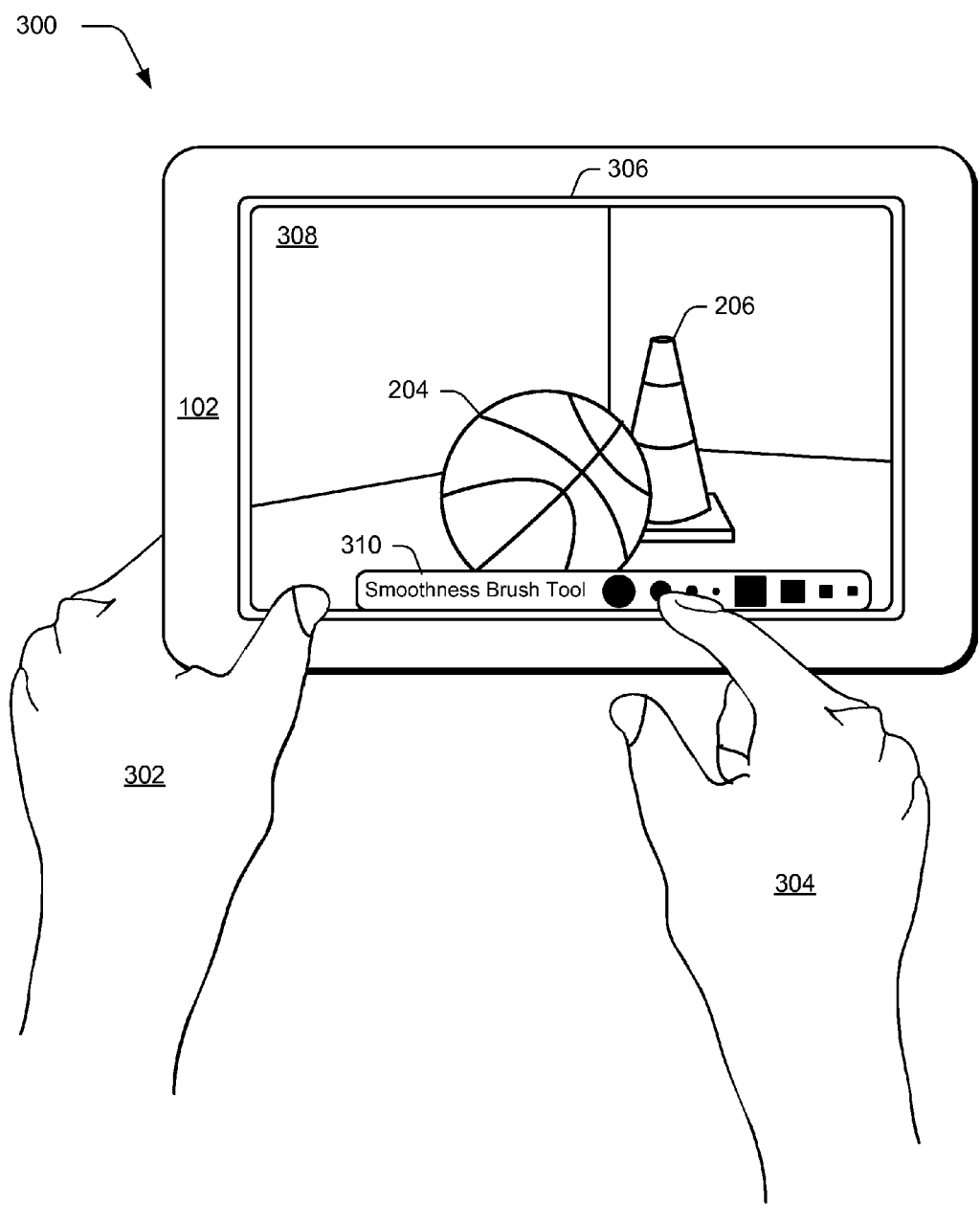
FIG. 3 depicts an example implementation in which a computing device of FIG. 1 is illustrated as outputting a user interface configured to permit user selection of a smoothness tool.

FIG. 3 depicts an example implementation 300 in which a computing device 102 of FIG. 1 is illustrated as outputting a user interface, through use of the user interface module 210 of FIG. 2, that is configured to permit user selection of a smoothness tool. In this example, the computing device 102 is illustrated as having a mobile form factor, such as a tablet computer, although other examples are also contemplated.

The computing device 302 is further illustrated as being held in a left hand 302 of a user, with interaction performed using a right hand 304 of a user. A display device 306 of the computing device 102, for instance, may include touchscreen functionality and therefore be configured to detect proximity of an object to the display device 306, e.g., a finger of the user's right hand 304. Other examples are also contemplated to support user interaction, such as through use of a cursor control device, speech recognition, and so on.

A user interface 308 is illustrated as being output for display by the display device 306. The user interface 308 includes a display of at least one of a plurality of stereoscopic images, e.g., image 112, which includes image data showing the ball 204 and traffic cone 206 of the image scene 116 of FIG. 1.

The user interface 308 is also illustrated as outputting a menu 310 via which a user may select a smoothness brush tool to indicate a user-defined region via which values of disparities of pixels are to vary smoothly, one to another. In the illustrated example, the menu 310 includes different shapes of brush tools that are user selectable. Other examples are also contemplated, such as to select functionality to draw a bounding box, and so on. A user may then interact with the user interface 308 via the smoothness tool to specify a user-defined region, an example of which is described as follows and shown in a corresponding figure.

Figure 4:
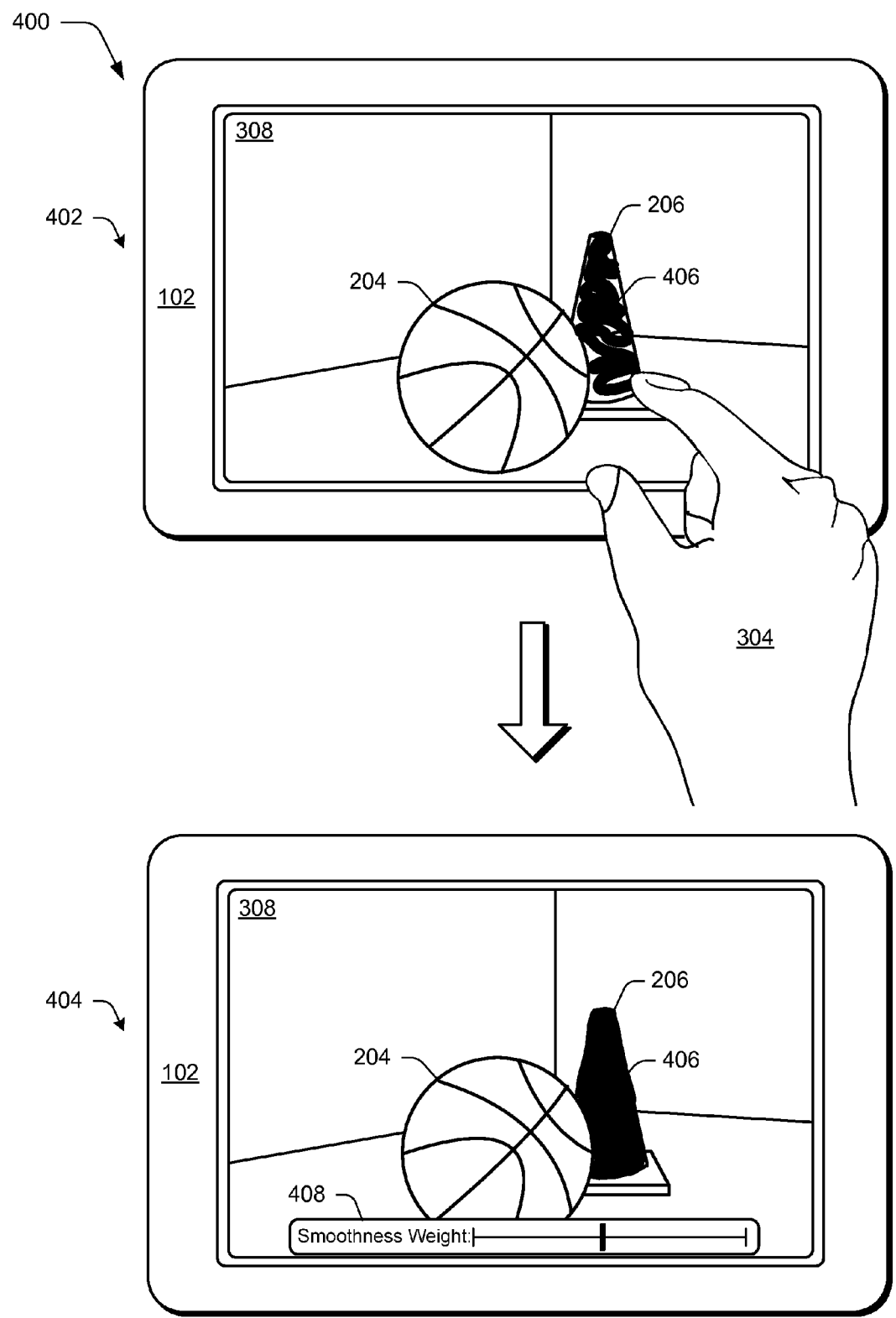
FIG. 4 depicts an example implementation showing interaction performed using a smoothness tool selected through interaction with a menu of a user interface of FIG. 3.

FIG. 4 depicts an example implementation 400 showing interaction performed using a smoothness tool selected through interaction with the menu 310 of the user interface 308 of FIG. 3. This example implementation is illustrated through the use of first and second stages 402, 404. At the first stage 402, a finger of a user's right hand 304 is illustrated as moving across a surface of the display device after selection of the smoothness brush tool in FIG. 3. Accordingly, an indication 406 is output that describes this movement and indicates an area of the image that is specified as a user-defined region. This selection may continue to indicate a user-defined region that corresponds to the traffic cone 206, a result of which is shown in the second stage 404.

At the second stage 404, a user has completed "filling in" the traffic cone 206 and has thus indicated a user-defined region of the user interface 308 that is to have a smoothness in disparities to be calculated for pixels in that region. The stereo correspondence module 122 may then take this indication of the user-defined region into account when calculating disparities for pixels in that region, such as part of the smoothness cost defined above, e.g., to specify a weight "c" for this region.

The user interface 308 may also be configured to support adjustments to the weight to be applied as part of the smoothness cost. An example of this is illustrated through a menu 408 having a control that is manipulable by a user to specify a smoothness weight. A variety of other examples are also contemplated, such as to manually enter a weight, e.g., a numerical value, and so on. Thus, the user interface may support techniques in which a user may manually specify a user-defined region in which disparities are to vary smoothly from one pixel to another. Although a brush tool was described, it should be readily apparent that the user-defined region may be specified in a variety of ways, such as through a bounding box, voice inputs, and so on. Further discussion of a system that may be employed to implement these techniques may be found in relation to the following discussion and corresponding figure.

Figure 5:
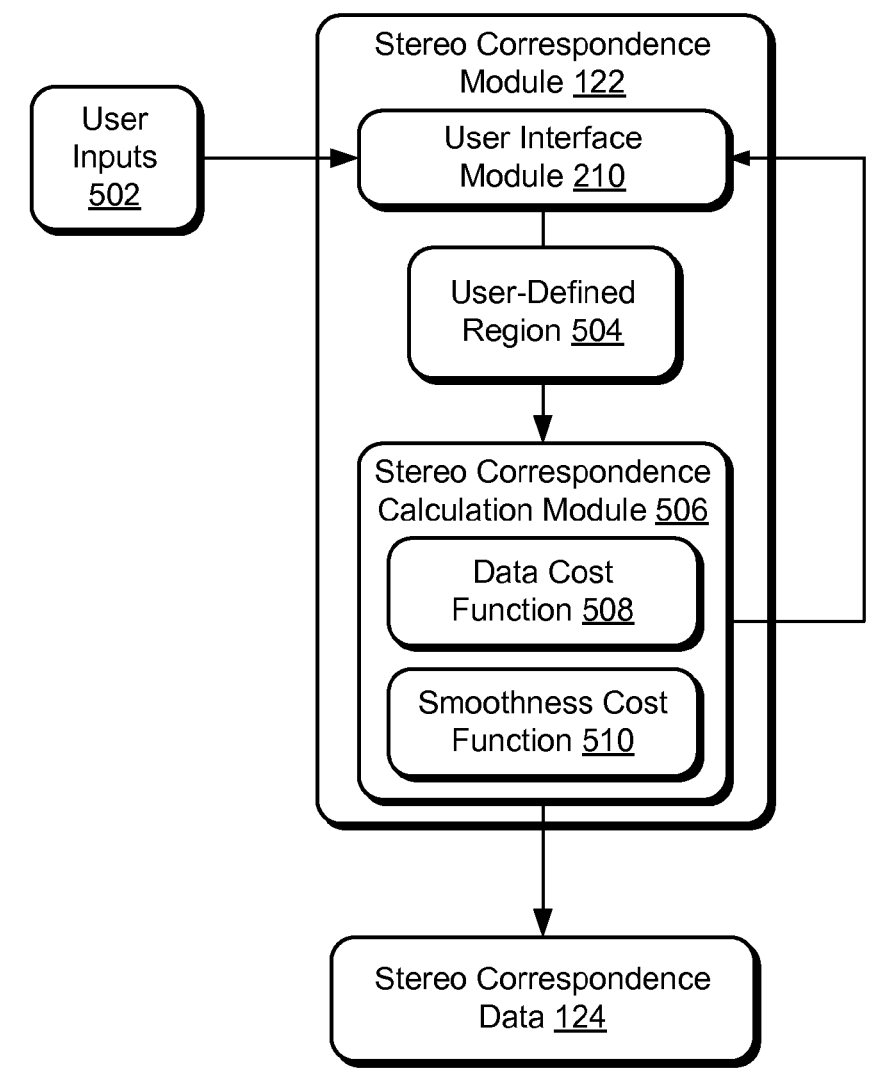
FIG. 5 depicts a system in an example implementation showing a stereo correspondence module of FIG. 1 in greater detail.

FIG. 5 depicts a system 500 in an example implementation showing a stereo correspondence module 122 of FIG. 1 in greater detail. The stereo correspondence module 122 is illustrated in greater detail through a plurality of sub-modules that are representative of functionality of the stereo correspondence module 122 to perform operations or cause operations to be performed. As such, it should be readily apparent that functionality represented by these modules may be implemented in a variety of ways without departing from the spirit and scope thereof.

User inputs 502 are received by a user interface module 210 through interaction with a user interface output by the module. These inputs may be received in a variety of ways, such as through interaction with a smoothness tool over a portion of a display image, a disparity map, and so on. In this way, the user inputs may be used to indicate a user-defined region 504 in which disparities of pixels is to vary in a smooth manner, e.g., by exhibiting changes below a defined threshold between pixels in the region.

A stereo correspondence calculation module 506 may then employ the user-defined region 504 as part of the calculation of stereo correspondence data 124. The stereo correspondence calculation module 506, for instance, may employ a data cost function 508 to describe similarities of pixels between the images 112, 114 as described above.

The stereo correspondence calculation module 506 may also employ a smoothness cost function 510. As previously described, the smoothness cost is based on an assumption that values of neighboring pixels are close. Accordingly, the smoothness cost of the energy function may be used to assign a cost based on similarity of a pixel to other pixels in the neighborhood of the pixel in the image, e.g., image 112 or image 114. Thus, the smoothness cost is based on consistency within the image, itself, as shown in the following expression:

$$v(f_p - f_q) = \min(c|f_p, f_q|, t)$$

A pairwise label cost is represented as "$|f_p, f_q|$" in the above expression. This calculation is generally performed for a neighborhood "N" for a pixel in question. In the above expression, a truncated linear model is employed is in which a cost increases linearly based on a different between labels "$f_p$" and "$f_q$" up to a level "t." Other examples are also contemplated.

In this example, the user-defined region 504 may be used to define a weight (e.g., "c" or "t") in the above expression that is to be used for pixels in the region. Further, this weight may be adjusted, such as through interaction with a control in the menu 408 of FIG. 4. Thus, a user-defined region 504 may be specified to have a relative smoothness in disparities such that for each pair of pixels in the region that are neighbors, the value "c" in the above expression is increased to increase smoothness in the disparities.

Additionally, the process may be iterative, as illustrated from the arrow leading back from the stereo correspondence calculation module 506 back to the user interface module 210. For example, a result of the stereo correspondence calculation may be output in the user interface, e.g., a disparity map, and so on. A user may then continue to specify user defined regions, which are again used by the stereo correspondence calculation module 506 in the generation of the stereo correspondence data 124. In this way, a user may continue to refine the calculations by defining regions to have a smoothness in disparities between pixels to achieve a desired result, further discussion of which may be found in relation to FIG. 7. A variety of other examples are also contemplated without departing from the spirit and scope thereof as described in the following section.

Example Procedures

The following discussion describes stereo correspondence user interface techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
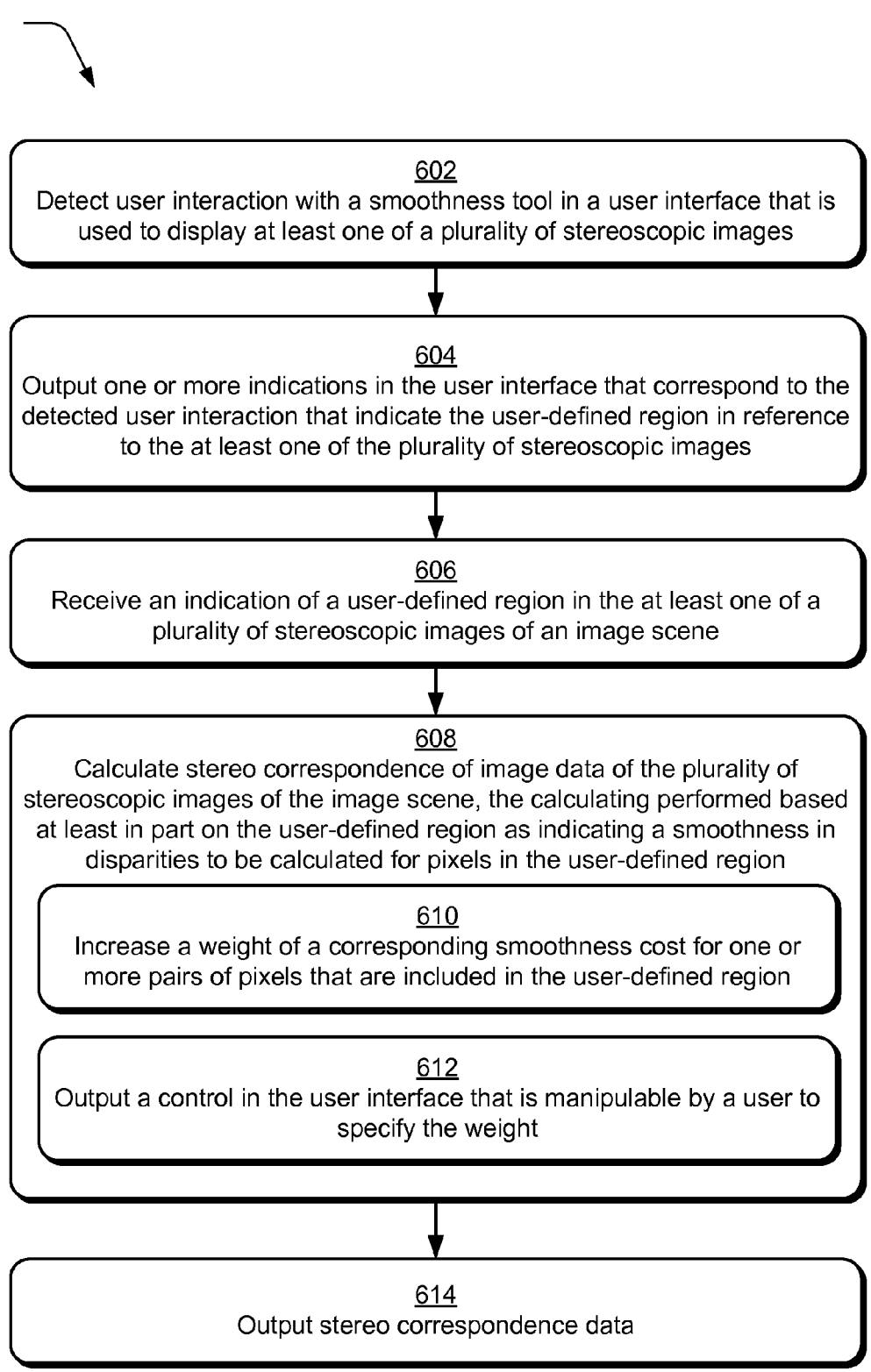
FIG. 6 is a flow diagram depicting a procedure in an example implementation in which a user-defined region is used as part of a stereo correspondence calculation.

FIG. 6 depicts a procedure 600 in an example implementation in which a user-defined region is used as part of a stereo correspondence calculation. User interaction is detected with a smoothness tool in a user interface that is used to display at least one of a plurality of stereoscopic images (block 602). A user, for instance, may select a smoothness brush tool as shown in FIG. 3, use a bounding box to indicate the user-defined region, and so on.

One or more indications are output in the user interface that correspond to the detected user interaction that indicate the user-defined region in reference to the at least one of the plurality of stereoscopic images (block 604). The indications, for instance, may give an appearance of paint or ink that is applied over portions of the image as shown in FIG. 4, may include output of indications of a bounding box that is user manipulable, a change is display characteristics of portions selected, and so on.

An indication is received of a user-defined region in the at least one of the plurality of stereoscopic images of an image scene (block 606). The indication, for instance, may include coordinates or other data that is descriptive to the user-defined region.

Stereo correspondence is calculated of image data of the plurality of stereoscopic images of the image scene, the calculating performed based at least in part on the user-defined region as indicating a smoothness in disparities to be calculated for pixels in the user-defined region (block 608). For example, this may include an increase in a weight of a corresponding smoothness cost for one or more pairs of pixels that are included in the user-defined region (block 610). Additionally, a control may be output in the user interface that is manipulable by a user to specify the weight (block 612) an example of which is shown in the second stage 404 of FIG. 4.

The stereo correspondence data is then output (block 614). This may include output of a disparity map, a three-dimensional representation of an image scene captured by the stereoscopic images, and so on.

Figure 7:
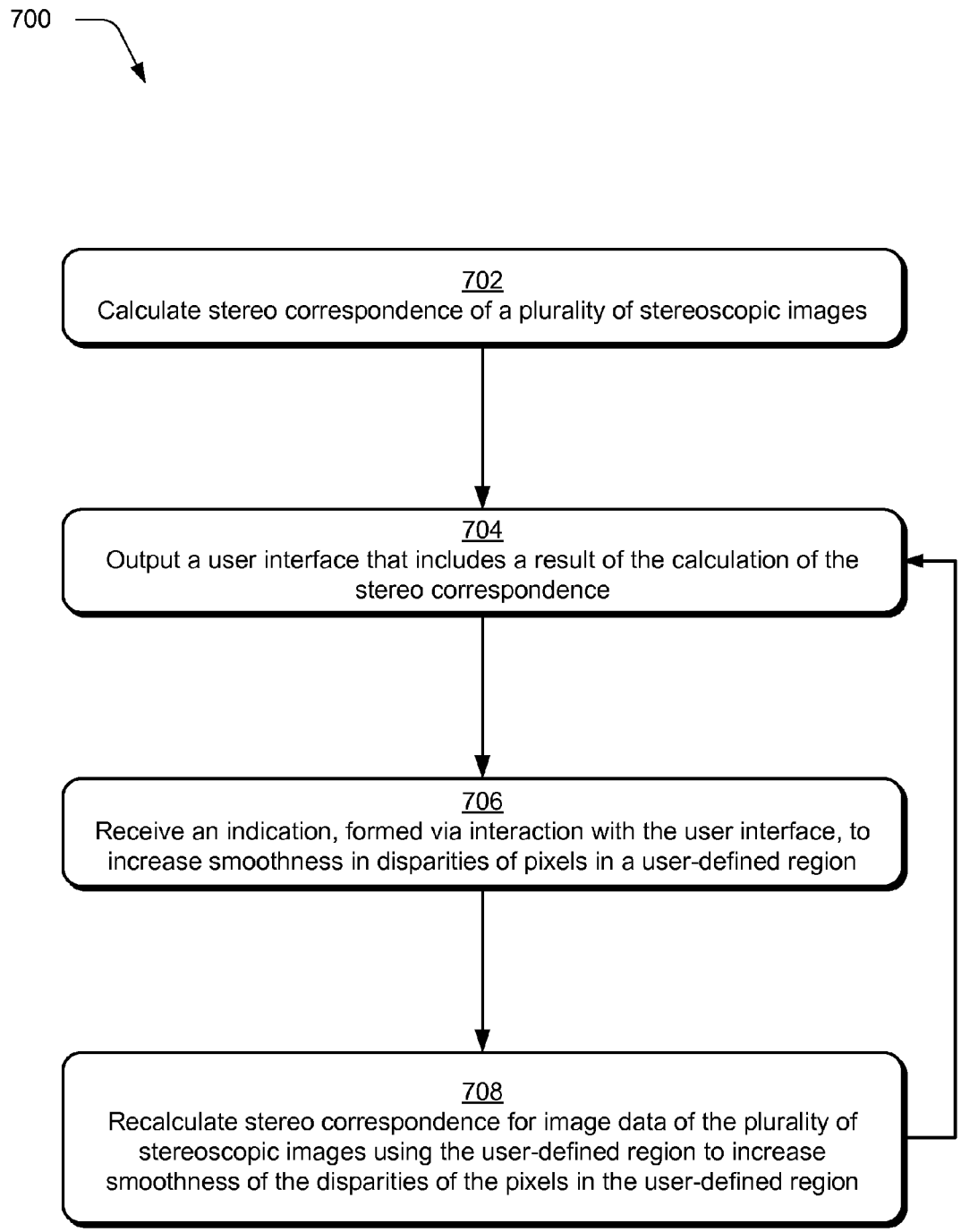
FIG. 7 is a flow diagram depicting a procedure in an example implementation in which an iterative process is used to calculate and then recalculate stereo correspondence of images using a user-defined region.

FIG. 7 depicts a procedure 700 in an example implementation in which an iterative process is used to calculate and then recalculate stereo correspondence of images using a user-defined region. Stereo correspondence of a plurality of stereoscopic images is calculated (block 702). As before, this may include a variety of techniques, such as belief propagation and so on.

A user interface is output that includes a result of the calculation of the stereo correspondence (block 704). The user interface, for instance, may include a disparity map, a three-dimensional representation of an image scene modeled from the stereoscopic images, and so on.

An indication is received, via interaction with the user interface, to increase smoothness in disparities of pixels in a user-defined region (block 706). This interaction, for instance, may include interaction with one of the stereoscopic images, the disparity map, the three-dimensional representation, and so on to specify user-defined regions that are to have a smoothness in disparities in pixels in the region, one to another.

Stereo correspondence is recalculated for image data of the plurality of stereoscopic images using the user-defined region to increase smoothness of the disparities of the pixels in the user-defined region (block 708). In this way, a user may specify a "correction" to be applied in the calculation of stereo correspondence. Additionally, this process may be iterative as shown in the figure such that a series of user-defined regions may be utilized to improve accuracy in the stereo correspondence calculation. A variety of other examples are also contemplated without departing from the spirit and scope thereof.

Example System and Device

Figure 8:
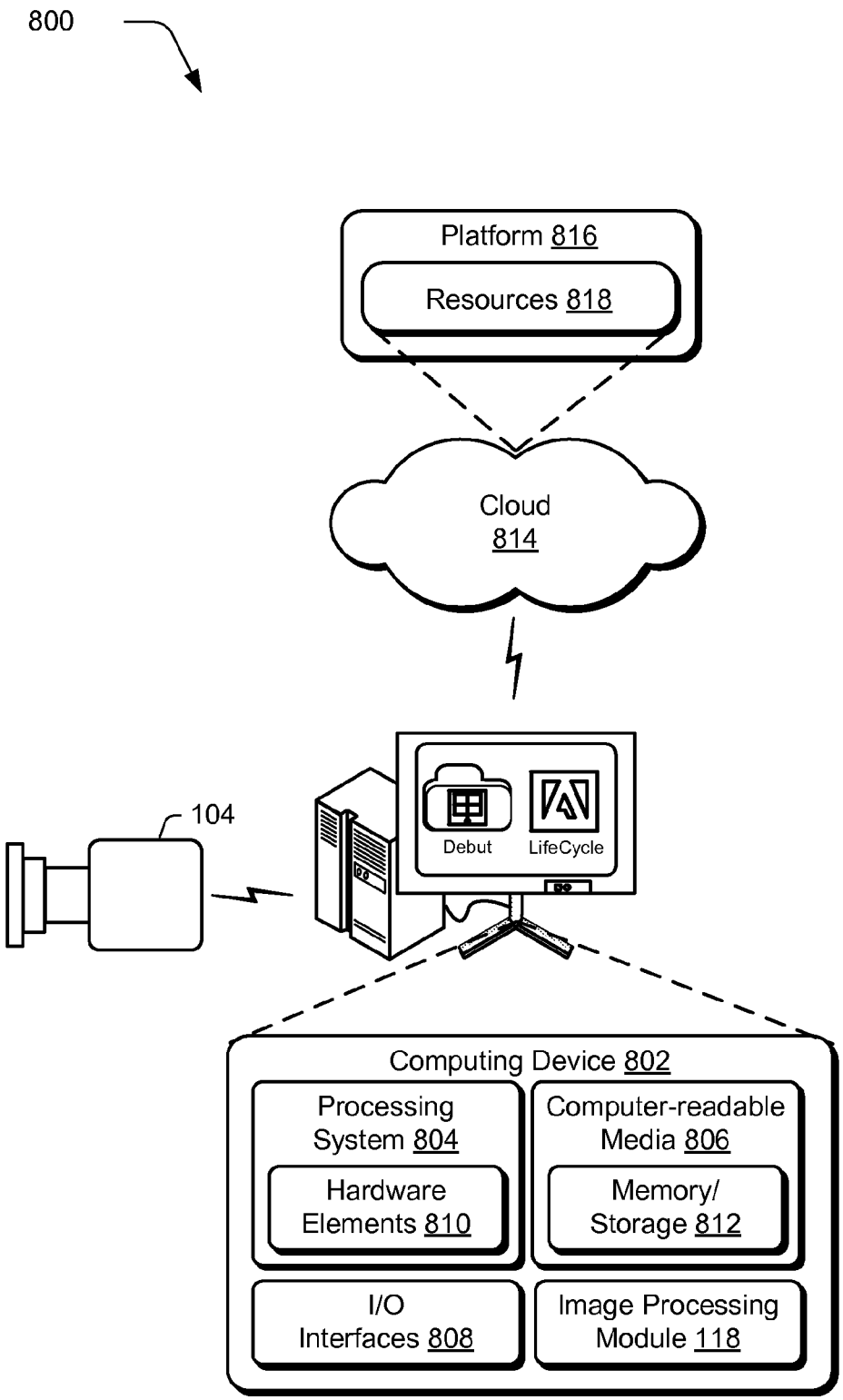
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the image processing module 118, which may be configured to process image data, such as image data captured by an image capture device 104. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
   receiving an indication of a user-defined region in at least one of a plurality of stereoscopic images of an image scene, the receiving including detecting user interaction with a smoothness tool in a user interface that is used to display the at least one of the plurality of stereoscopic images; and
   calculating stereo correspondence of image data of the plurality of stereoscopic images of the image scene, the calculating performed based at least in part on the user-defined region as indicating a smoothness in disparities to be calculated for pixels in the user-defined region.

2. A method as described in claim 1, wherein the detecting of the indication includes detecting movement of a cursor control device or an object detectable as part of a gesture to indicate the user-defined region through use of corresponding movement of the smoothness tool over the display of the at least one of the plurality of stereoscopic images.

3. A method as described in claim 1, further comprising outputting one or more indications in the user interface that corresponds to the detected user interaction that indicate the user-defined region in reference to the at least one of the plurality of stereoscopic images.

4. A method as described in claim 1, wherein the receiving of the indication includes detecting user interaction that is used to generate the indication of the user-defined region.

5. A method as described in claim 1, wherein the calculating of the stereo correspondence of the image using the user-defined region includes increasing a weight of a corresponding smoothness cost for one or more pairs of pixels that are included in the user-defined region.

6. A method as described in claim 5, further comprising outputting a control in the user interface that is manipulable by a user to specify the weight.

7. A method as described in claim 5, wherein the pixels are neighbors within the user-defined region.

8. One or more computer-readable storage media comprising instructions that are stored thereon that, responsive to execution by a computing device, causes the computing device to perform operations comprising:
   calculating stereo correspondence of a plurality of stereoscopic images;
   outputting a user interface that includes a result of the calculation of the stereo correspondence;
   receiving an indication, formed via interaction with the user interface, to increase smoothness in disparities of pixels in a user-defined region; and
   recalculating stereo correspondence of image data of the plurality of stereoscopic images using the user-defined region to increase smoothness of the disparities of the pixels in the user-defined region.

9. One or more computer-readable storage media as described in claim 8, wherein the result is a disparity map or three-dimensional model.

10. One or more computer-readable storage media as described in claim 8, wherein the receiving of the indication includes detecting user interaction with at least one of the plurality of stereoscopic images in the user interface.

11. One or more computer-readable storage media as described in claim 8, wherein the receiving of the indication includes detecting user interaction with a disparity map or three-dimensional model.

12. One or more computer-readable storage media as described in claim 8, wherein the recalculating of the stereo correspondence of the image using the user-defined region includes increasing a weight of a corresponding smoothness cost for one or more pairs of pixels that are included in the user-defined region.

13. One or more computer-readable storage media as described in claim 12, further comprising outputting a control in a user interface that is manipulable by a user to specify the weight.

14. One or more computer-readable storage media as described in claim 12, wherein the pixels are neighbors within the user-defined region.

15. A computing device comprising:
   one or more processors; and
   one or more computer readable storage media embodying computer readable instructions which, when executed by the one or more processors perform operations comprising:
   receiving an indication of a user-defined region in at least one of a plurality of stereoscopic images of an image scene, the receiving including detecting user interaction with a smoothness tool in a user interface that is used to display the at least one of the plurality of stereoscopic images; and
   modifying stereo correspondences calculated for image data of a plurality of stereoscopic images of the image scene, the correction performed based at least in part on the user-defined region as indicating a smoothness in disparities to be calculated for pixels in the user-defined region.

16. A computing device as described in claim 15, the operations further comprising outputting one or more indications in the user interface that correspond to the detected user interaction that indicate the user-defined region in reference to the at least one of the plurality of stereoscopic images.

17. A computing device as described in claim 15, wherein the modification of the stereo correspondence using the user-defined region includes increasing a weight of a corresponding smoothness cost for one or more pairs of pixels that are included in the user-defined region.

18. A computing device as described in claim 17, the operations further comprising outputting a control in a user interface that is manipulable by a user to specify the weight.

19. One or more computer-readable storage media as described in claim 17, wherein the pixels are neighbors within the user-defined region.

20. One or more computer-readable storage media as described in claim 15, wherein the detecting of the user interaction includes detecting movement of a cursor control device or an object detectable as part of a gesture to indicate the user-defined region through use of corresponding movement of the smoothness tool over the display of the at least one of the plurality of stereoscopic images.

\* \* \* \* \*